Nov. 18, 1958     A. Y. DODGE     2,860,526
TRANSMISSIONS
Filed March 2, 1953
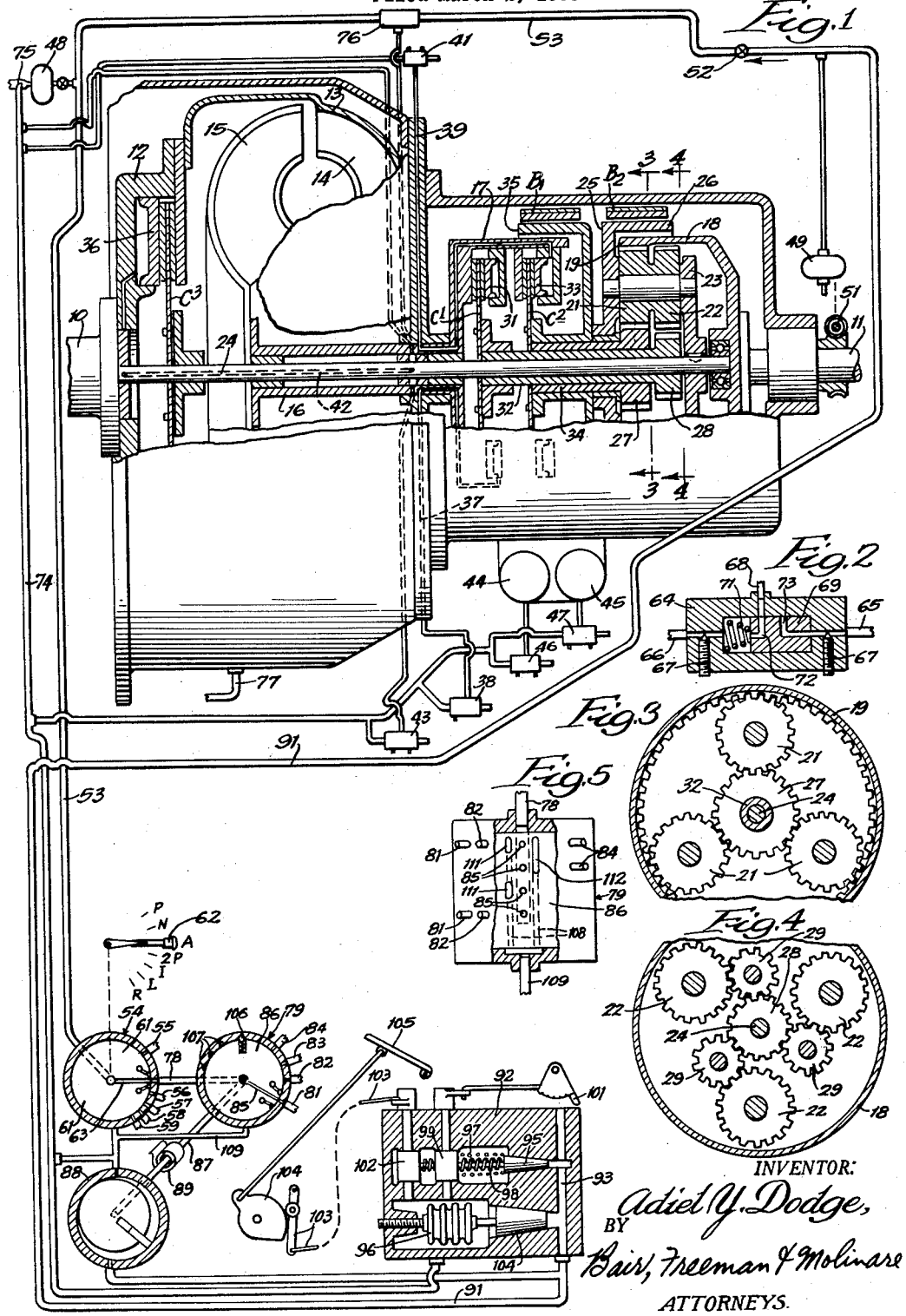
INVENTOR:
Adiel Y. Dodge,
BY
Bair, Freeman & Molinare
ATTORNEYS.

United States Patent Office 2,860,526
Patented Nov. 18, 1958

2,860,526

TRANSMISSIONS

Adiel Y. Dodge, Rockford, Ill.

Application March 2, 1953, Serial No. 339,767

10 Claims. (Cl. 74—754)

This invention relates to transmissions and more particularly to transmissions of the type used on automotive vehicles.

For effective and comfortable operation of automotive vehicles, either passenger cars or trucks, it is necessary to employ a transmission which will provide a plurality of torque and speed ratios to meet different operating conditions and which can be changed easily and quickly from one ratio to another. It is also highly desirable to provide means in the transmission to effect automatic ratio changes as operating conditions change.

It is one of the objects of the present invention to provide a transmission which is simple and relatively inexpensive in construction and which provides a large number of torque and speed ratios with a relatively small number of gear and control elements.

According to one feature of the invention, the transmission will provide at least four forward speed ratios and a reverse ratio with a single ring gear, two sun gears and a single planet carrier controlled by two brakes and not more than three simple clutches.

Another object is to provide a transmission in which a change from one ratio to another is effected easily and quickly by engaging not more than one clutch or brake and disengaging another.

A further object is to provide a transmission which is controlled automatically in response to operating conditions through a relatively simple fluid control system.

According to various other features of the invention, the control system includes an automatic distributor valve provided with yielding detents to hold the valve yieldingly in a desired ratio and to facilitate rapid and positive movement from one ratio to another, automatic return valves to effect disengagement of a desired clutch or brake rapidly and positively when the operating pressure is released, and bleed ports in the distributor valve to bleed the pressure lines during selected shifting operations to insure that there will be no blocking of the control.

The above and other objects and features of the invention will be more readily apparent from the following description when read in connection with the accompanying drawing, in which:

Figure 1 is a side elevation with parts in section of a transmission embodying the invention, with portions of the control system illustrated diagrammatically.

Figure 2 is an enlarged section through an automatic return valve,

Figures 3 and 4 are sections on the lines 3—3 and 4—4, respectively, of Figure 1, and Figure 5 is a side elevation with the parts broken away of the automatic distributor valve.

The transmission, as shown, is adapted to connect a driving shaft 10 which may be the crank shaft of an internal combustion engine to a driven shaft 11 which may be connected through the usual differential gear to the driving wheels of a vehicle. The driving shaft 10 is connected through a flywheel housing 12 to the impeller housing 13 of a hydraulic torque transmitting unit which may be either a conventional fluid coupling or a hydraulic torque converter, as desired. The housing 13 carries a series of driving vanes 14 which circulate liquid over driven vanes 15 carried by a driven rotor co-axial with the impeller. The rotor is drivably secured to and is carried by a sleeve 16 which is secured to a clutch housing 17.

The hydraulic torque transmitting unit is connected to the driven shaft through a compound planetary gear set including a drum 18 permanently secured to the driven shaft and carrying a set of internal ring gear teeth 19. The ring gear 19 meshes with teeth on a planet pinion 21 forming a part of the compound planetary gear set which includes a second pinion portion 22. The planet pinions are rotatably carried by a gear carrier including one end disc 23 secured to a shaft 24 which extends through the driving sleeve 16. The carrier is completed by a second end disc 25 terminating in a brake drum 26 adapted to be engaged by a brake B2 to hold the carrier against rotation.

The planetary gear set is completed by a pair of sun gears 27 and 28. In the preferred construction illustrated, the pinion sections 21 and 22 are of equal diameter and the sun gear 27 is of a size to mesh with the pinion 21 while the sun gear 28 is of a smaller size to clear the pinion 22. As best seen in Figure 4, the carrier carries a plurality of idler pinions 29 which intermesh with the sun gear 28 and the pinions 22 to connect them.

The connections between the different elements of the gear unit and the driving shaft or hydraulic torque transmitting unit are controlled by clutches indicated at C1, C2 and C3. When the clutch C1 is engaged, as through the annular hydraulic piston 31, it will connect the driven rotor 15 of the hydraulic unit through a sleeve 32 to the small sun gear 28. When the clutch C2 is engaged through a similar annular hydraulic piston 33, it will connect the driven rotor 15 through a sleeve 34 to the large sun gear 27. The sleeve 34 may also carry a brake drum 35 to be engaged by a brake B2 to hold the large sun gear 27 against rotation. When the clutch C3 is engaged through an annular hydraulic piston 36, it will connect the shaft 24 directly to the driving shaft 10.

Through the very simple gear set, as shown, it is possible to obtain five forward gear ratios in addition to reverse. For the lowest forward ratio, clutch C1 and brake B2 are engaged and the remaining brakes and clutches are disengaged. At this time, the hydraulic unit will turn the small sun gear 28 forwardly and the planet carrier 25 will be held stationary. The sun gear 28 will drive the planet pinions 22 through the idler pinions 29 causing the planet pinions 21 and 22 to turn in a forward direction. Since the planet carrier is held stationary, the ring gear and the driven shaft will be turned forward at reduced speed and increased torque. While substantially any desired torque multiplication ratio can be obtained through selection of proper gear sizes, I have found that one convenient gear size for use in passenger vehicles may product a mechanical ratio of approximately 3.7 to 1 under these conditions.

For intermediate forward drive, the clutch C1 remains engaged, but brake B2 is disengaged and the brake B1 is engaged. At this time, the planet pinions will be turned in a forward direction in the same manner as in low gear drive, but since the sun gear 27 is held stationary and the carrier is released, the planet pinions and carrier will roll around the sun gear 27 and will drive the ring gear and driven shaft forward at higher speed.

For direct forward drive both of the brakes are disengaged and the clutches C1 and C2 are both engaged. At this time, the two sun gears 27 and 28 will be turned forward at the same speed so that the entire planet gear set will turn forward in locked condition as a unit to turn the driven shaft 11 at the same speed as the driven rotor 15.

For two-path forward drive, the clutch C1 remains engaged, the clutch C2 is dis-engaged and the clutch C3 is engaged. Under these conditions, the planet carrier 25 is driven forward through the clutch C3 at the same speed as the driving shaft 10 and the sun gear 28 is driven forward through the hydraulic unit. The combination of these two forward rotating movements will turn the ring gear and the driven shaft forward at a speed which is variable in accordance with the variable drive of the hydraulic unit through two parallel paths of power flow. While the exact ratios obtainable will vary with the type and design of the hydraulic unit, one desirable construction for passenger vehicle drives will produce an overall speed ratio between the driving shaft 10 and the driven shaft 11 varying from 1.2 to 1 to 1 to 1.

For overdrive, the clutch C3 remains engaged, the clutch C1 is dis-engaged and the brake B1 is engaged. At this time, planet carrier 25 is driven forward positively at the same speed and torque as the driving shaft 10 and the sun gear 27 is held stationary. The planet pinions will therefore be turned forward as they roll around the fixed sun gear 27 to drive the ring gear and the driven shaft forward at a speed higher than that of the driving shaft. A convenient ratio for passenger car use can easily be obtained with gearing of substantially the proportion shown to produce a drive of approximately .73 to 1 in overdrive.

For reverse, the clutch C2 and the brake B2 are engaged while the remaining clutches and brakes are dis-engaged. Under these conditions, sun gear 27 is driven forward by the driven rotor 15 and the planet carrier is held stationary by the brake B2. The planet pinion 21 will therefore turn the ring gear and the driven shaft in reverse at a ratio determined by the relative sizes of the sun gear 27 and the ring gear. In a construction substantially as shown, this ratio will be approximately 2.67 to 1.

According to the present invention, the several brakes and clutches may be controlled hydraulically in such a manner that a desired ratio may be selected manually or with an automatic change of ratio between certain of the forward ratios. As shown, the several clutches are adapted to be engaged by the application of hydraulic pressure to the annular pistons therefore through liquid supply passages formed in the casing and shaft parts. Thus the clutch C1 is controlled by supply of pressure through a passage 37 formed in the transmission casing and connected to an automatic return valve 38. The clutch C2 is similarly controlled by operating liquid supplied through the passage 39 in the transmission casing which is connected to an automatic return valve 41. The clutch C3 is controlled by fluid supplied through a bore 42 in the shaft 24 which is connected to an automatic return valve 43. The brakes B1 and B2 are controlled by fluid operated motors 44 and 45, respectively, which are connected to automatic return valves 46 and 47.

Operating liquid under pressure is supplied by either of two pumps 48 and 49 which may be gear pumps or any other desired type of positive displacement pumps. The pump 48 is connected through suitable driving connections, not shown, to the driving shaft 10 to be operated whenever the engine is running. The pump 49 is geared through gearing indicated at 51 to the driven shaft 11 to produce a pressure proportional to the speed of the driven shaft and hence of the vehicle. The outlet sides of the pumps 48 and 49 are connected through a check valve 52 which will permit flow from the pump 49 toward the pump 48 but will prevent flow in the opposite direction.

The common outlet conduit 53 for the two pumps is connected first to a manually operated distributor valve indicated generally at 54. As shown, the valve 54 has a cylindrical casing formed with a plurality of outlet connections 55, 56, 57, 58 and 59 which are spaced circumferentially and axially of the casing. A cylindrical rotor 61 is rotatable in the casing and is connected to a manual operating lever 62 by which it may be turned to different positions. The fluid supply line 53 communicates with the valve body 61 which is formed with a plurality of discharge passages 63 at different levels to communicate selectively with the outlet passages as the valve body is turned.

When the lever 62 is raised to the park position indicating at P the valve body will be turned so that the outlet passages 63 will communicate with the outlet ports 55. In this position operating fluid is supplied to the quick return valves 46 and 47 for the brakes B1 and B2 so that both brakes are engaged and the driven shaft 11 is held against turning.

When the lever 62 is moved to the neutral position marked N the discharge passages 63 are all cut off so that all of the brakes and clutches are dis-engaged. At this time, there is no connection between the driving and driven shafts.

Skipping for the moment, the automatic position illustrated, the lever 62 may be moved to the two-path position marked 2P to bring the ports 63 into communication with the outlet openings 56. In this position, the clutches C1 and C3 will be engaged to produce the two-path drive described above.

The next downward movement of the lever 62 to the intermediate position marked I will bring the discharge ports 63 into communication with the valve openings 57 to engage clutch C1 and brake B1. At this time, the intermediate drive described above will be produced.

The next downward movement of the operating lever to the low position marked L will bring the ports 63 into communication with the outlet passages 58 to engage the clutch C1 and the brake B2 for low drive.

The lowest position for reverse, marked R, will bring the ports 63 into communication with the passages 59 to engage the clutch C2 and the brake B2 and effect reverse drive, as described above.

It will be noted that for each driving position, as described, the valve outlet passages 63 are connected to selected ones of the quick return valves 38, 43, 46 and 47 through which fluid is passed to the desired clutch or brake operating mechanisms. The quick return valves are all of substantially identical construction, as shown in Figure 2.

As shown, each valve comprises a body 64 formed with a cylindrical bore having an inlet connection 65 at one end and an outlet connection 66 at its opposite end. Needle valve 67 may be provided, as shown, to restrict the rate of flow through the inlet and outlet passages. Centrally of its length the valve body is formed with a connection 68 which leads to the clutch or brake to be controlled thereby. A cylindrical plunger 69 is slidable in the body and is urged toward the inlet end thereof by a spring 71. The plunger is formed with a first angular passage 72 which normally communicates with the connection 68 and with the outlet connection 66. A second angular passage 73 connects the inlet connection 65 to the connection 68 when the valve plunger is shifted to the left against the spring 71.

The automatic release valve will normally occupy the position shown in Figure 2 connecting the connections 68 to the outlet connections 66. When operating pressure is supplied through inlet connection 65 to any one of the quick release valves, it will act on the end of the plunger 69 to shift the valve plunger to the left cutting off the connection between 63 and 66 and establishing communication between 65 and 68. At this time, operating fluid will flow through the automatic release valves to the clutch or brake actuators to operate the several clutches or brakes selectively. It will be understood that the inlet connection 65 for the valves are connected as desired to the outlet connections 55—59 of the manual selector valve to select the desired speed ratios.

The outlet ports for the several automatic release valves are all connected to a main return line 74 leading to the inlet of the pump 48 and also the inlet of the pump 49. In order to reduce the pressure at the outlet connections to effect quick release of the clutches and brakes, the return line 74 preferably communicates with the pump inlet through an injector 75. In this way when the pump 48 is operating which occurs during normal operating conditions, reduced pressure will be produced in all of the valve outlet connections to operate the valves quickly and cause quick and positive release of the brakes and clutches.

It will be apparent that during many operating conditions the pumps will produce an excess of liquid circulation over that required to operate the controls. Preferably this excessive quantity of liquid is circulated through the hydraulic torque transmitting unit by means of a pressure responsive valve 76 mounted in the pump outlet line 53 and connected to the hydraulic unit. Thus after a pre-determined pressure is reached in the line 53 the valve 76 will open so that liquid will be circulated through the hydraulic unit to cool it. Liquid circulated through the unit will collect in the bottom of the housing therefor and may be withdrawn therefrom through the return line 77 connected to the inlet sides of the pumps.

In addition to the manual control positions described above, the control lever 62 may be moved to an automatic position, as shown, to connect the ports 63 to a passage 78 in the manual selector valve 54. The passage 78 supplies fluid to an automatic selector valve indicated generally at 79 and whose construction may be generally similar to that of the manual valve 54. As shown, the automatic valve includes a cylindrical casing having four outlets connections 81, 82, 83 and 84 to communicate selectively with supply ports 85 in a rotatable valve body 86 in the casing. The valve body 86 may be connected through an operating shaft 87 to a fluid motor 88 which will turn it automatically to its different operative positions in response to operating conditions of the transmission.

A coil spring 89 acting on the shaft 87 normally urges the automatic selector valve to its intermediate position, as shown. The motor 88 is controlled, as shown, in response to the output pressure of the driven pump 49 as modified in accordance with accelerator pedal position and subject further to manual setting control. This is accomplished by providing in the outlet line 91 from the pump 49 an automatic pressure control valve which may be constructed as more particularly described and claimed in my Patent No. 2,372,817.

This valve, as illustrated, comprises a body 92 having an inlet passage 93 connected to the pump 49, pressure line 91 and also to the motor 88. Pressure may be bled from the line 91 past a pair of conical valves 104 and 95. The valve 104 is normally urged against its seat by a closed bellows 96 which is responsive to temperature to close tighter as the temperature increases thereby to compensate for changes in viscosity of the oil employed for operation. The valve 95 is urged against this seat by two springs 97 and 98. The spring 97 seats against a cam 99 which can be adjusted manually through a lever 101 to vary the setting of the spring 97 thereby to select manually the desired type of operation. For example, when the spring is set tighter, speed changes will occur more rapidly for ecomical operation whereas when the spring is set more loosely, the valve will be seated with less force to delay transmission ratio changes for greater performance.

The spring 98 seats against a cam 102 which is connected through linkage 103 to a cam 104 operated by the usual accelerator pedal indicated at 105. When the accelerator pedal is depressed, the spring 98 will be relaxed so that the pressure acting on the motor 88 will be reduced and the change to higher ratio will tend to be delayed. Accelerator pedal position produces a rough approximation of the torque load on the driven shaft whereas the pressure produced by pump 49 will be proportional to the speed of the driven shaft so that the pressure supplied to the motor 88 will be proportional to a function of the speed and torque conditions of operation.

The motor 88, as shown, is a simple vane type of motor which tends to turn in response to pressure supplied thereto to turn the shaft 87 and the valve body 86 counter-clockwise to effect higher speed ratios. With the manual valve in its automatic position, as shown, and a relatively low pressure supplied to the motor 88, the automatic valve will supply operating fluid to the connection 81 which communicates with the clutch C1 and brake B1 to produce intermediate drive. As the pressure increases, the motor 88 will turn and shift the valve 79 to communication with the connections 82 which communicate with the two clutches C1 and C2 to effect direct drive. Upon a further increase in pressure, the valve 79 will be turned to communicate with the connections 83 which in turn communicate with the clutches C1 and C3 to produce two-path drive. After a relatively high speed is reached, the valve body 86 will be further turned to register with the connections 84 which communicate with the clutch C3 and brake B1 for overdrive.

It will be seen that automatic operation of the valve 79 will occur during both speed increases and speed decreases and in accordance with the accelerator pedal position, so that the transmission is always in its optimum operating condition.

In order to effect decisive movements of the automatic valve 79 from one position to the other, spring detent means are provided shown as comprising a spring pressed ball 106 carried by the valve body and adapted to enter recesses 107 in the valve casing. The detent is preferably set so that it will not release until sufficient pressure has been built up in the motor 88 to turn the valve body quickly from one operating position to the next. Thus the detent insures that the automatic valve will at all times be in one operating position and will not hesitate between successive operating conditions regardless of the direction of change.

According to another feature of the invention, the selector valves 54 and 79 are preferably both provided with pressure relief ports which will insure relief of fluid pressure in the operating connections during certain movements of the valves. These relief ports are best illustrated in Figure 5 in connection with the automatic selector valve 79, although it will be understood that similar ports are provided in the manual selector valve 54. As shown, the valve body 86 is formed with a pair of relief passages 108 drilled partially therethrough from the bottom and communicating through the bottom of the valve body with a return line 109 which is connected to the return conduit 74. The passages 108 terminate in a pair of spaced relief ports 111 lying at one side of the upper and third supply ports 85 and with a single relief port 112 lying at the right side of the upper two supply ports 85. The two connections 81 are spaced vertically with the uppermost connection connected to the brake B1 and the lowermost connection connected to the clutch C1. The connections 82 also lie at the upper and lowermost ports with the upper connection connected to the clutch C2 and the lower connection connected to the clutch C1. The connections 83, not shown in Figure 5, lie opposite the first or topmost and third ports with the upper connection going to the clutch C3 and the third connection going to the clutch C1. The connections 84, as shown, lie opposite the two upper ports and lead respectively to the brake B1 and the clutch C3.

As the valve body is turned from its intermediate position to its direct drive position, the uppermost port 111 will cross the upper connection 81 to release pressure therefrom, thereby to permit the valve plunger in the corresponding automatic relief valve to shift to the relief position and to insure that the brake B1 will be released. The clutch C1, which is operated through the lower connection 81, is to remain engaged and since there is no relief port adjacent the lower supply port 85, pressure will not be relieved in this connection. The size of the relief ports is so selected that during normal operating movements it will pass just sufficient fluid to allow the piston on the connected automatic relief valve to move to its discharge position while maintaining the pressure connections substantially full to eliminate the necessity of filling the lines on each operation.

Similarly, in passing from direct drive to two-path, pressure in the connection to the clutch C1 will not be relieved because of the absence of a relief port opposite the lowermost port 85. However, pressure in the upper connection 82 will be relieved through the upper port 111 to insure release of the clutch C3. In going from two-path to overdrive, pressure in the connection to the clutch C1 will be relieved through the lower port 111 and pressure in the connection to the clutch clutch C3 will be relieved through the upper port 111 since both of these clutches are to be released during this change.

Similarly, in shifting downward only those elements which are connected through the upper two ports will be relieved from pressure through the port 112 and by proper selection of the connections, it will be insured that only those clutches or brakes which are to be released will be relieved during the shifting. Therefore, unnecessary engaging and dis-engaging movements of the clutches and brakes are avoided while at the same time insuring positive release of those clutches or brakes which it is necessary to release.

The manual selector valve is provided with similar relief passages and relief ports positioned to effect selective relieving of pressure in the clutch or brake operators, as desired.

It will be noted that even though several connections may run from the selector valves to the automatic return valves there will be no cross flow since all but one of the connections are closed by the selector valves at any one time. Also all of the connections are maintained full of liquid at all times through cooperation of the automatic return valves and pressure relief ports so that the clutch or brake operators will be operated quickly without the delay required to fill long lengths of piping.

While one embodiment of the invention has been shown and described in detail, it will be understood that this is illustrative only and is not to be taken as a definition of the scope of the invention, reference being had for this purpose to the appended claims.

What is claimed is:

1. A transmission for connecting a driving shaft to a driven shaft comprising a pair of sun gears, a ring gear, a gear carrier, a pair of connected planet pinions on the carrier, one of the planet pinions meshing with the ring gear and one of the sun gears, an idler pinion on the carrier meshing with the other planet pinion and the other sun gear, a connection from the ring gear to the driven shaft, means including clutches to connect the sun gears selectively to the driving shaft, brakes selectively to hold the gear carrier and one of the sun gears against rotation, fluid actuators to control the clutches and brakes, a source of fluid under pressure, connections from the source to the actuators to supply fluid thereto, and automatic return valves in the connections including parts movable to one position responsive to supply of fluid under pressure to connect the actuators to the source of fluid under pressure and movable to a second position when pressure is relieved to connect the actuators directly to a pressure return connection.

2. A transmission for connecting a driving shaft to a driven shaft comprising a pair of sun gears, a ring gear, a gear carrier, a pair of connected planet pinions on the carrier, one of the planet pinions meshing with the ring gear and one of the sun gears, an idler pinion on the carrier meshing with the other planet pinion and the other sun gear, a connection from the ring gear to the driven shaft, means including clutches to connect the sun gears selectively to the driving shaft, brakes selectively to hold the gear carrier and one of the sun gears against rotation, fluid actuators to control the clutches and brakes, a pump having a fluid inlet and a fluid outlet, selector valve means connected to the pump outlet, connections from the selector valve means to the actuators, and automatic return valves in the connections including parts movable to one position responsive to fluid pressure in the connections to connect the selector valve means to the actuators and movable to a second position when pressure in the connections is relieved to connect the actuators to the pump inlet.

3. A transmission for connecting a driving shaft to a driven shaft comprising a gear set including a plurality of intermeshing and interconnected gear elements, a connection from one of the gear elements to the driven shaft, a plurality of clutches to connect certain of the elements of the gear set to the driving shaft, a plurality of brakes to hold certain of the elements of the gear set against rotation, the clutches and brakes being operable in predetermined combinations to effect different driving ratios, fluid pressure responsive actuators for the brakes and clutches, a pump to supply actuating fluid to the actuators, a distributor valve connected to the pump outlet and having a plurality of discharge ports, connections between the actuators and the discharge ports respectively, a return line communicating with the pump inlet, and a return valve in each of the connections between the actuators and discharge ports connected with the return line and including a part shiftable in response to fluid pressure to connect the actuators to the distributor valve and a spring acting on said part in the absence of fluid pressure to shift it to a position to connect the actuators to the return line.

4. The construction of claim 3 in which the return line is connected to the pump inlet through an injector to maintain a reduced pressure in the return line.

5. The construction of claim 3 in which the distributor valve includes a rotatable valve body having a plurality of axially spaced fluid pressure ports and a casing having axially and angularly spaced ports with which the pressure ports selectively register as the valve body is turned, and a plurality of pressure relief ports in the valve body at the sides of certain of the pressure ports only.

6. A transmission for connecting a driving shaft to a driven shaft comprising a gear set including a plurality of intermeshing and interconnected gear elements, a connection from one of the gear elements to the driven shaft, a plurality of clutches to selectively connect certain of the elements of the gear set to the driving shaft, a plurality of selectively operable brakes to hold certain of the elements of the gear set against rotation, the clutches and brakes being operable in predetermined combinations to effect different driving ratios, fluid pressure responsive actuators for the brakes and clutches, a pump to supply actuating fluid to the actuators, an automatic selector valve including a rotary valve body having a pressure port therein and a casing including a plurality of outlet ports connected respectively to different ones of the actuators, a spring urging the valve body to a position to effect a relatively low speed ratio driving condition, a rotary fluid motor connected to the valve body to turn it against the spring to positions for effecting higher speed ratio drives, a manually operable selector valve having outlet ports connected to the actuators respectively and to the automatic selector valve, to select manually a desired ratio or automatic operation, and means to supply operating fluid to the motor at a pressure proportional to the speed and torque operating conditions of the transmission.

7. A transmission for connecting a driving shaft to a driven shaft comprising a variable ratio transmission unit including a ratio changing member, a fluid actuator connected to said member to actuate it thereby to control the transmission ratio, a fluid pump, a shiftable selector valve including relatively movable elements and connected to the pump to receive operating fluid under pressure therefrom, a supply and return connection from the selector valve to the fluid actuator, and an automatic return valve in the connection responsive to fluid pressure transmitted in the connection from the selector valve to connect the selector valve to the actuator and operative in the absence of pressure in said connection to vent the actuator, the selector valve having a pressure relief port therein which is momentarily opened to said connection during shifting of the selector valve to relieve the pressure acting on the automatic return valve.

8. A transmission for connecting a driving shaft to a driven shaft comprising a variable ratio transmission unit including a ratio changing member, a fluid actuator connected to said member to actuate it thereby to control the transmission ratio, a fluid pump, a shiftable selector valve including relatively movable elements and connected to the pump to receive operating fluid under pressure therefrom, a supply and return connection from the selector valve to the fluid actuator, and an automatic return valve in the connection including a part resiliently urged to a position to vent the actuator and moved in response to fluid pressure to a position to connect the actuator to the selector valve, the selector valve being shiftable to one position to connect the pump to the connection and to a second position to close the connection and having a relief port therein momentarily opened to the connection during shifting between said positions to relieve pressure on the automatic return valve.

9. A transmission for connecting a driving shaft to a driven shaft comprising a variable ratio transmission unit including a ratio changing member, a fluid actuator connected to said member to actuate it thereby to control the transmission ratio, a fluid pump, a shiftable selector valve including relatively movable elements and connected to the pump to receive operating fluid under pressure therefrom, a supply and return connection from the selector valve to the fluid actuator, a driving connection from the pump to the driven shaft, a fluid motor in fluid communication with the pump and connected to the selector valve to shift it, a control valve connected to the motor to control the pressure of fluid supplied to the motor, a control device to control power supplied to the driving shaft, a connection between the control device and the control valve to adjust the valve in accordance with movement of the control device, and an automatic return valve in the supply and return connection normally urged to a position to vent the actuator but shiftable in response to fluid pressure in the connection to a position to connect the selector valve to the actuator.

10. The construction of claim 9 in which the selector valve includes a pressure relief port momentarily opened to the supply and return connection during shifting of the selector valve to relieve the pressure on the automatic return valve.

References Cited in the file of this patent

UNITED STATES PATENTS

| | | |
|---|---|---|
| 1,619,705 | Chorlton | Mar. 1, 1927 |
| 1,979,488 | Perez | Nov. 6, 1934 |
| 2,055,303 | Patterson | Sept. 22, 1936 |
| 2,150,950 | Thoma | Mar. 21, 1939 |
| 2,329,724 | Maurer | Sept. 21, 1943 |
| 2,352,212 | Lang et al. | June 27, 1944 |
| 2,372,817 | Dodge | Apr. 3, 1945 |
| 2,590,280 | Swift | Mar. 25, 1952 |
| 2,591,342 | Dodge | Apr. 1, 1952 |
| 2,605,652 | Kelbel | Aug. 5, 1952 |
| 2,627,189 | McFarland | Feb. 3, 1953 |
| 2,629,265 | Dodge | Feb. 24, 1953 |
| 2,725,762 | Hettinger et al. | Dec. 6, 1955 |

FOREIGN PATENTS

| | | |
|---|---|---|
| 632,292 | Great Britain | Dec. 30, 1945 |
| 929,571 | France | July 15, 1947 |